Figures 1, 2:
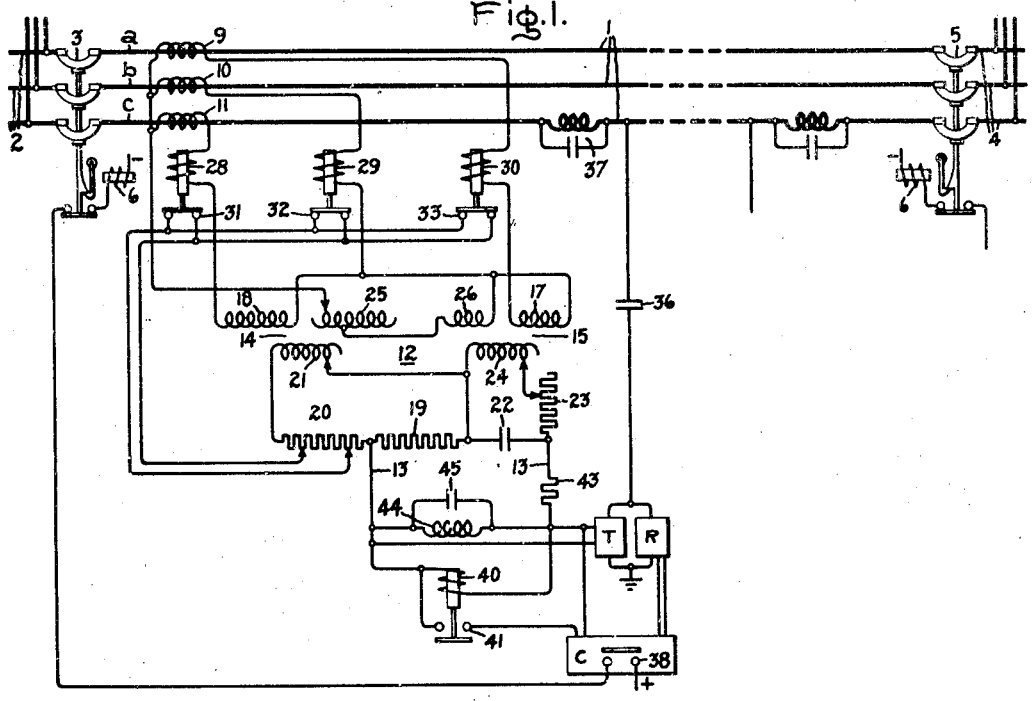

Inventor:
Andrew J. McConnell,
by Harry E. Dunham
His Attorney.

Patented Dec. 21, 1948

2,456,976

UNITED STATES PATENT OFFICE 2,456,976

PHASE RESPONSIVE PROTECTIVE RELAYING SYSTEM

Andrew J. McConnell, Albany, N. Y., assignor to General Electric Company, a corporation of New York Application May 25, 1945, Serial No. 595,722

12 Claims. (Cl. 175—294)

My invention relates to protective relaying systems for electric power circuits and particularly to such systems of the phase comparison type which utilize a pilot or communication channel to compare the phase relation of two similar alternating current quantities respectively present at two predetermined points of the power circuit, such as the ends of a line section to be protected.

In some protective relaying systems of the phase comparison type, a single phase quantity is derived from the currents in the power circuit conductors at each end of the line section being protected and is arranged during one of its half cycles to effect a predetermined control operation at its respective end of the line section such as the opening of a power circuit breaker at that end if during the same half cycle no blocking signal is received over the communication channel from the other end of the protected line section. During the other half cycle of each derived single phase quantity, a blocking signal is arranged to be transmitted over the communication channel. The relative polarities of the two single phase quantities at the two ends of a line section are such that during an external fault a blocking signal is transmitted over the communication channel from one end during one half cycle and a blocking signal is transmitted over the communication channel from the other end during the other half cycle of each derived single phase quantity so that a substantially continuous blocking signal is transmitted to prevent any control operation from being effected at either end. During an internal fault, however, there is a reversal in the relative polarities of the two derived single phase quantities of approximately 180° so that blocking signals are simultaneously transmitted over the communication channel during one of the half cycles of the single phase quantities and no blocking signal is transmitted during the other half cycle so that a control operation is effected during these other half cycles.

In order to insure proper operation of such a relaying system in response to all kinds of faults that may occur on the power circuit, it is necessary to derive at each relaying point or terminal an alternating current quantity of a sufficient magnitude to effect the proper operation of the relaying system under all kinds of faults that may occur on the protected section irrespective of the number of line conductors involved in the fault.

One object of my invention is to provide an improved arrangement for obtaining at each relaying terminal in a protective relaying system of the phase comparison type a single phase quantity of the proper phase and magnitude to effect the correct operation of the relaying system under all fault conditions which may occur on the section being protected.

Another object of my invention is to provide an improved arrangement for insuring in a protective relaying system of the phase comparison type that the means for transmitting the blocking signal is always rendered operative before any control function can be effected.

In accordance with my invention, I derive from the power circuit at each relaying point for comparison purposes a single phase voltage which is proportional to a predetermined function of the rotatable phase sequence currents in the circuit during faults of a predetermined type and which is proportional to a different function of the rotatable phase sequence currents in the circuit during faults of a different predetermined type. In the preferred embodiment of my invention I provide at each end of a line section to be protected a suitable negative phase sequence network so as to obtain a single phase voltage which is proportional to the negative phase sequence current in the line section. Since, however, such a network produces no output voltage on balanced three-phase faults, I also provide each phase sequence network with means for changing the setting thereof so that the output is also a function of the positive phase sequence currents at the respective relaying terminal whenever a three-phase fault condition exists. Means are also provided whereby if the negative phase sequence currents which flow in the line section due to a ground fault are not sufficient to effect the proper operation of the relaying equipment, the negative phase sequence network may be readily adjusted so that it is biased by the residual or ground current in the protected line section to cause the output voltage of the network to be of a sufficient magnitude under ground fault conditions to effect the proper operation of the relaying system.

My invention will be better understood from the following description when taken in connection with the accompanying drawing, Fig. 1 of which illustrates a preferred embodiment of my invention in connection with a protective relaying arrangement for one end of a protected line section of an electric power circuit, and Fig. 2 of which is a modification of the phase sequence network shown in Fig. 1 and the scope of my invention will be pointed out in the appended claims.

In the embodiment of my invention shown in Fig. 1 of the drawing, the protected apparatus is a line section 1 of a three-phase power circuit having line conductors a, b, and c. One end of the line section 1 is connected to a bus 2 by a suitable circuit interrupter 3, and the other end of the line section 1 is connected to a bus 4 by a suitable circuit interrupter 5. The circuit interrupters 3 and 5 are respectively provided with trip coils 6 for effecting the opening thereof.

Since the protective equipment at the two ends of the protected line section may be identical, I have shown in detail only that portion of the equipment at the end of the line section 1 which is connected to the bus 2, as is deemed necessary for a clear understanding of my invention. It is to be understood however that a similar arrangement of apparatus is associated with the circuit interrupter 5 at the other end of the protected line section 1.

Each end or terminal equipment of the relaying system comprises a bank of three current transformers 9, 10, and 11, respectively connected in series relation with the line conductors a, b, and c of the protected line section 1 and energizing a suitable negative phase sequence network 12 which is arranged to impress across the output circuit 13 thereof a single phase voltage which is proportional in magnitude to the negative phase sequence current flowing in the protected line section 1 at the point where the current transformers 9, 10, and 11 are connected thereto.

As shown, the phase sequence network 12 comprises two transformers 14 and 15, each of which is of the type known in the art as a transactor, namely a combined reactor and transformer, which produces an output voltage proportional to the input current. The secondary windings of the current transformers 9, 10, and 11 are connected in star. The secondary winding of the current transformer 9 is also connected in series with a primary winding 17 of the transactor 15 so that the transactor is energized by the current in the line conductor a, and the secondary winding of the current transformer 11 is connected in series with a primary winding 18 of the transactor 14 so that this transactor is energized by the current in the line conductor c. A fixed resistor 19 and an adjustable resistor 20 are connected in series across the secondary winding 21 of the transactor 14, and a capacitor 22 and an adjustable resistor 23 are connected in series across the secondary winding 24 of the transactor 15. The capacitor 22 and the resistor 23 are arranged so that the voltage drop across the capacitor 22 lags the secondary voltage of the transactor 15 by 60°. The effective secondary turns of the transactor 15 are such that for the same primary current in the primary windings 17 and 18 the voltage across the capacitor 22 is slightly less than the secondary voltage of the transactor 14. The resistor 20 is adjusted so that the voltage across the resistor 19 under such current conditions in the primary windings 17 and 18 is equal to the voltage across the capacitor 22. The secondary circuits of the transactors 14 and 15 are so interconnected and the output circuit 13 is so connected thereto that with balanced three-phase currents in the line section 1 the voltage across the output circuit 13 is substantially zero and is proportional to the negative phase sequence current in the line section at the point where the current transformers 9, 10, 11 are connected.

Since it is desirable to have each terminal equipment adaptable for use on a power circuit in which a ground fault on the protected line section may not be sufficient to produce enough negative phase sequence current to cause the network output voltage to reach a desired minimum value, each network 12 is provided with means for biasing it with zero phase sequence current if it is desirable to do so. This means comprises an adjustable primary winding 25 on the transactor 14 and connected to the secondary windings of the current transformers 9, 10, and 11 in such a manner as to be energized by the residual current flowing from the secondary windings.

In installations where it is desirable to have the output voltage of the network proportional solely to the negative phase sequence current, which may be the case where the minimum negative phase sequence current for all internal ground faults on the protected system is always above a predetermined value, the effective turns of the primary winding 25 are adjusted so that they are equal to the effective turns of a primary winding 26 on the transactor 15 and are connected in series with winding 26. The effective turns of the primary windings 25 and 26 are equal to one-third the effective turns of each of the primary windings 17 and 18 since the residual current from the transformers 9, 10, and 11 is equal to three times the zero phase sequence current in each of the primary windings 17 and 18. The primary windings 18 and 25 and the primary windings 17 and 26 are arranged so that the zero phase sequence voltages respectively induced in the secondary winding 21 of the transactor 14 and in the secondary winding 24 of the transactor 15 are zero under such conditions.

Consequently the network 12 produces an output circuit voltage of the same magnitude for a given magnitude of phase-to-phase fault current regardless of which pair of line conductors is involved in the fault. Also, a given ground fault current in any line conductor, due to a single phase ground fault, causes the network 12 to produce an output circuit voltage which is of the same magnitude irrespective of the line conductor involved in the fault. Also, a similar two-phase ground fault on any two line conductors causes the network 12 to produce an output voltage which is of the same magnitude irrespective of the two line conductors involved in the fault. Therefore, if the power circuit is of such a character that the negative phase sequence current, under all ground faults on the line section 1, is always above a predetermined minimum value, a simple negative phase sequence network can be used to derive the necessary single phase voltage to control the relaying system.

When it is desired to add a zero phase sequence voltage to the negative phase sequence output voltage of the network 12, this may be done readily by varying the number of effective turns of the primary winding 25 relative to the number of turns of the primary winding 26 so that the zero phase sequence voltage induced in the secondary winding 21 of the transactor 14 is no longer zero.

Since a three-phase fault produces substantially no negative phase sequence current in line conductors a, b, and c, substantially no voltage is produced across the output circuit 13 of the network 12 under such fault conditions. In order that a sufficient output voltage may be obtained under such fault conditions, I provide means for changing the connections of the network under such abnormal conditions so that the output voltage of the network is a function of the positive phase sequence current in the line section 1 at the point where the current transformers 9, 10, and 11 are connected. In the particular arrangement shown in Fig. 1, the connections of the network 12 are changed during a three-phase fault so that the output voltage is a function of both the positive and negative phase sequence currents in the line section instead of being a function of the negative phase sequence current only. For effecting changes in the output voltage of the network 12 under three-phase fault conditions, I provide three fault detector relays 28, 29, and 30, which are respectively connected so as to be responsive to the currents in the phase conductors a, b, and c. As shown, the relays 28, 29, and 30 respectively have windings which are connected in series with the secondary windings of current transformers 9, 10, and 11 and respectively have normally closed contacts 31, 32, and 33 which are connected in parallel in a shunt circuit around a portion of the resistor 20 in the secondary circuit of the transactor 14. Therefore, when a three-phase fault occurs, all three of the relays 28, 29, and 30 open their contacts and effect an increase in the effective portion of the resistor 20 so that the voltage drop across this effective portion of the resistor 20 is increased and the voltage drop across the resistor 19 is decreased. Consequently, the voltage drop across the resistor 19 is no longer equal to the voltage drop across the capacitor 22, and therefore a voltage is obtained across the output circuit 13 under balanced three-phase fault conditions.

In the embodiment of my invention shown in Fig. 1, I utilize the single phase output voltage of the network 12 as a means for controlling the energizing circuit of the trip coil 6 of the associated circuit interrupter 3 so that the trip coil 6 can be sufficiently energized to effect the opening of the circuit interrupter only when the output voltage of the network 12 exceeds a predetermined value not produced by normal load currents in the line conductors a, b, and c of the protected line section 1. The single phase output voltage of the network 12 also controls the transmission of a suitable high frequency current over one of the line conductors of the protected line section such for example as the line conductor c and controls the operation of a suitable comparison device which compares the phase relation of the phase sequence network output voltages at the two ends of the protected line section.

At each end of the protected line section 1, a suitable high frequency transmitter T and a suitable high frequency receiver R are coupled by suitable coupling means such as a capacitor 36 to the line conductor c, which is provided at each end thereof with a wave trap 37 to prevent an external fault between the line conductor c and ground from short-circuiting the high frequency channel and also to prevent the high frequency current from being transmitted into the adjacent bus. All of the transmitters T and receivers R may be tuned to the same frequency so that each receiver R can receive high frequency current from the transmitter T at either end of the line section or the transmitter T at one end and the receiver R at the other end may be tuned to one frequency and the receiver R at said one end and the transmitter T at said other end may be tuned to a different frequency. At each end of the protected line section 1, a comparison device C is associated with the receiver R and the network output circuit 13 thereat in such a manner as to effect the energization of the associated trip coil 6 during predetermined half cycles of the associated network output voltage if during these same half cycles no high frequency current is received by the associated receiver R. Since pilot relaying systems of the phase comparison type, in which high frequency transmitters are arranged to transmit only during a particular half cycle of a relatively low frequency single phase voltage and in which comparison devices are arranged to effect a predetermined switching operation only when the associated receiver does not receive high frequency current during the other half cycle of the relatively low frequency single phase voltage, are well known in the art and since my present invention is not limited to the details of such transmitters, receivers and comparison devices, they are represented in the drawing by rectangles in order to simplify the disclosure. The comparison device C contains the contacts 38 which are arranged to be closed in response to the occurrence of a half cycle of the voltage of the output circuit 13 during which the associated transmitter T is inoperative if, during that same half cycle, the associated receiver R is receiving no high frequency current from the transmitter T at the other end of the line section 1.

The polarities of the network output voltages at the two ends of the protected line section 1 are such that when fault current flows into one end of the line section and out of the other end, the polarities of the two output voltages are substantially 180° out of phase, and these output voltages control their respective transmitters T in such a manner that during the half cycle when the transmitter T at one end is operative, the transmitter T at the other end is inoperative and vice versa when the transmitter T at said other end is operative, the transmitter T at said one end is inoperative. Consequently, under external fault conditions high frequency current is continuously transmitted over the line conductor c and the comparison device C at each end of the protected line section is rendered inoperative to close its contacts 38. Under internal fault conditions when currents simultaneously flow into the line section at each end, the polarities of the network output voltages at the two ends of the line section are substantially in phase so that during the half cycle when the transmitter T at one end is operative, the transmitter T at the other end is also operative, and during the half cycle when the transmitter T at said one end is inoperative, the transmitter T at said other end is also inoperative. Consequently, under internal fault conditions, during the half cycle when the comparison device C at each end is operative to close its respective contacts 38 it can do so because the associated receiver R does not receive high frequency current during that particular half cycle.

In order to prevent the energization of the associated trip coil 6 in response to network output voltages which are too low to effect the operation of the associated transmitter T on external faults, a fault detector 40 is connected to each network output circuit 13 in such a manner as to render the associated comparison device C and the associated trip coil 6 operative only when the network output circuit voltage exceeds a predetermined value above the voltage that effects the operation of the associated transmitter T. The fault detector may also be used to effect other control operations such for example as to give the relaying equipment control of the high frequency channel in the event it is being used for some other purpose.

As shown, the fault detector 40 is a relay having an energizing winding connected across the network output circuit 13 and having contacts 41 in a control circuit for the comparison device C. The relay 40 is arranged to close the contacts 41 when the network output circuit voltage exceeds a predetermined value. While I have shown the fault detector relay 40 as being connected directly across the network output circuit 13, it will be evident to those skilled in the art that in order to minimize the load on the network 12, suitable amplifying means may be interposed between the network and the fault detector relay winding. Since such amplifying means are well known in the art and form no part of my present invention, they have been omitted in order to simplify the disclosure.

Since harmonics in the power circuit current are magnified in secondary currents of the transactors 14 and 15, a resistor 43 is connected in series with the network output circuit 13, and a reactor 44 and a capacitor 45 are connected in parallel across the output circuit 13 to form a harmonic filter, the reactor 44 and the capacitor 45 being arranged for parallel resonance at the frequency of the power current flowing in the line section 1 so that very little current of the fundamental frequency flows through the shunt circuit. To currents of harmonic frequencies, however, the parallel impedance of the reactor 44 and the capacitor 45 is relatively low so that the voltage drop produced by these harmonic currents across the resistor 43 is correspondingly high and very little distortion appears in the single phase voltage supplied to the transmitter T, the comparison device C and the relay 40.

The operation of the relaying system shown in Fig. 1 will be apparent from the description thereof given above. Under normal load conditions, the output circuit voltage of the phase sequence network 12 is always below the value which effects the operation of the associated detector relay 40. Also, the contacts of the fault detector relays 28, 29, and 30 are closed under normal load conditions so that the output circuit voltage of the network 12 is proportional to the negative phase sequence current only or to a function of the negative phase sequence current and the zero phase sequence current in the line section at the point where the current transformers 9, 10, and 11 are connected depending upon the tap connection of the primary winding 25 of the transactor 14. For the purpose of this description of the operation, it will be assumed that the top connection of the winding 25 is such that the output voltage of the network 12 is proportional to the negative phase sequence current only. It is apparent that if it is desirable to bias the network 12 with zero phase sequence current, this may be readily done by varying the number of effective turns of the primary winding 25 of the transactor 14.

Since the contacts 41 of the fault detector relay 40 are open under normal load conditions, the associated comparison device C is inoperative to close its contacts 38, which are connected in the energizing winding of the trip coil 6 of the associated circuit interrupter 3.

When a phase-to-phase fault or a ground fault occurs, the current in each line conductor involved in the fault is sufficient to cause the fault detector relay connected in series relation therewith to open its contacts. However, under such fault conditions, there is always at least one line conductor which is not involved in the fault so that its associated fault detector relay maintains its contacts closed around the normally shunted portion of the resistor 20. Consequently, during a phase-to-phase fault or a ground fault, the output voltage of the network 12 remains proportional to the negative phase sequence current and is unaffected by the positive phase sequence current flowing in the line section at the point where the associated current transformers 8, 9, and 10 are connected.

When a three-phase fault occurs, however, all three of the fault detector relays 28, 29, and 30 are sufficiently energized to open their respective contacts and thereby change the setting of the network 12 so that the output circuit voltage thereof is proportional to a function of both the positive and negative phase sequence currents flowing in the line section at the point where the associated current transformers 8, 9, and 10 are connected.

During a fault on the power circuit, the output voltage of the phase sequence network 12 at each end of the line section 1 is sufficient to cause the associated fault detector relay 40 to close its contacts 41 and to render the associated transmitter T operative to transmit a blocking signal during a predetermined half cycle of the output voltage and to render the associated comparison device C operative during the other half cycle of the output voltage. If the fault is outside of the line section 1, the polarities of the two network output voltages at the ends of the line section 1 are such that a blocking signal is transmitted over the line conductor c substantially continuously so that the comparison devices C at the two ends do not close their respective contacts 38. When, however, the fault is within the line section 1, both transmitters T transmit blocking signals only during the same half cycle so that the comparison device C at each end of the line section closes its contact 38 during the other half cycle and thereby completes through the contacts 41 of the associated fault detector relay 40 an energizing circuit for the trip coil 6 of the associated circuit interrupter.

In the embodiment of my invention shown in Fig. 1, the output circuit voltage of the network 12 is changed under three-phase fault conditions so that it is a function of both the positive and negative phase sequence currents present in the line section at the point where the network is connected thereto. In the modification shown in Fig. 2, the setting of the network 12 is changed so that under three-phase fault conditions the output circuit voltage is a function of the positive phase sequence current and independent of the negative phase sequence current. This result is accomplished by having the three-fault detector relays 28, 29, and 30, when they are simultaneously operated by fault current, effect a change in the secondary circuits of the transactors 14 and 15 which will cause voltage across the output circuit 13 to be zero when only negative phase sequence current is present in the line section 1 and to be proportional to positive phase sequence current when it is present in the line section.

The effective turns of the primary winding 25 may be adjusted at will so that the network output voltage is either a function of the positive phase sequence current only or a function of both the positive and zero phase sequence currents.

As shown, in Fig. 2 the resistors 19 and 20 of Fig. 1 have been omitted, and the parallel connected contacts 31, 32, and 33 of the relays 28, 29, and 30 respectively, are connected in series with the capacitor 22 so that the circuit through the capacitor 22 is opened under three-phase fault conditions. Also, the detector relays 28, 29, and 30 are provided with normally open contacts 47, 48, and 49 which are connected in series and which, when simultaneously closed, connect a reactor 50 in series with the resistor 23 across the secondary winding of the transactor 15. The reactor 50 is designed to produce a voltage drop across it which leads the secondary voltage of the transactor 15 by 60° and which is substantially equal in magnitude to the secondary voltage of the transactor 14 so that negative phase sequence current in the protected line section produces a voltage across the output circuit 13 which is substantially zero, whereas a positive phase sequence current in the protected line section produces an output circuit voltage which varies proportionally thereto.

Since it is usually desirable to have the relaying equipment less sensitive to positive phase sequence current than to negative phase sequence current, I also energize the detector relay 40 from across a portion of a resistor 51, which in turn is connected across the network output circuit 13. Another portion of the resistor 51 is normally short-circuited by the parallel connected normally closed contacts 53, 54, and 55 of the detector relays 28, 29, and 30 respectively, so that normally a predetermined portion or all of the network output voltage is impressed across the winding of the detector relay 40. When a three-phase fault occurs, however, and the setting of the network 12 is shifted by the operation of the detector relays 28, 29, and 30 so that the network output voltage varies as a function of the positive phase sequence current, the opening of the contacts 53, 54, and 55 results in a smaller portion of the output circuit voltage being impressed across the winding of the detector relay 40. Consequently, it requires a higher value of positive phase sequence current than negative phase sequence current to effect the operation of the detector relay 40.

While I have in accordance with the patent statutes shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States, is:

1. In a protective arrangement for a polyphase circuit, means for deriving from said circuit a single phase quantity the magnitude of which varies substantially solely in response to variations in the magnitude of a predetermined rotational phase sequence component of the circuit current, and means responsive to a predetermined fault condition of said circuit for rendering said first mentioned means operative to derive a single phase quantity the magnitude of which varies in response to variations in the magnitude of the other rotational phase sequence component of the circuit current.

2. In a protective arrangement for a polyphase circuit, means for deriving from said circuit a single phase voltage the magnitude of which depends solely upon the magnitude of the negative phase sequence component of the circuit current, and means responsive to a fault involving all of the conductors of said circuit for rendering said first mentioned means operative to derive a single phase voltage the magnitude of which depends upon the positive phase sequence component of the circuit current.

3. In a protective arrangement for a polyphase circuit, means for deriving from said circuit a single phase voltage having a magnitude which is dependent upon the magnitude of a predetermined phase sequence component of the circuit current and independent of the magnitude of a second predetermined phase sequence component of the circuit current, and means responsive to a predetermined fault condition of said circuit for rendering said first mentioned means operative to derive a single phase voltage having a magnitude which depends upon the magnitude of said second predetermined phase sequence component of the circuit current.

4. In a protective arrangement for a polyphase circuit, means for deriving from said circuit a single phase voltage having a magnitude which is dependent upon the magnitude of a predetermined phase sequence component of the circuit current and independent of the magnitude of a second predetermined phase sequence component of the circuit current, and means responsive to a predetermined fault condition of said circuit for rendering said first mentioned means operative to derive a single phase voltage having a magnitude which depends upon the magnitude of said both of said predetermined phase sequence components of the circuit current.

5. In a phase sequence network for a polyphase circuit, means for deriving from said circuit two single phase voltages which are substantially equal in magnitude and opposite in phase when only predetermined rotational phase sequence current is present so that the resultant voltage is substantially zero in said circuit and which are displaced in phase so as to produce a resultant voltage when only the other rotational phase sequence current is present in said circuit, and means responsive to a predetermined fault condition in said circuit for rendering said first mentioned means operative to produce a resultant voltage when only said predetermined rotational phase sequence current is present in said circuit.

6. In a phase sequence network for a polyphase circuit, means for deriving from said circuit two single phase voltages which are substantially equal in magnitude and opposite in phase when only positive phase sequence current is present in said circuit so that the resultant voltage is substantially zero and which are displaced in phase so as to produce a resultant voltage when only negative phase sequence current is present in said circuit, and means responsive to a fault involving all phases of said circuit for rendering said first mentioned means operative to produce a resultant voltage when only positive phase sequence current is present in said circuit.

7. In a phase sequence network for a polyphase circuit, means for deriving from said circuit two single phase voltages which are substantially equal in magnitude and opposite in phase when only positive phase sequence current is present in said circuit so that the resultant voltage is substantially zero and which are displaced in phase so as to produce a resultant voltage when only negative phase sequence current is present in said circuit, and means responsive to a fault involving all phases of said circuit for causing said first mentioned means to produce two unequal voltages when only positive phase sequence current is present in said circuit.

8. A phase sequence network for a three-phase circuit comprising a single phase transformer having a primary winding connected to said circuit so as to be energized in response to the current in one of the phase conductors of said circuit, resistance means connected across the secondary winding of said transformer, a second transformer having a primary winding connected to said circuit so as to be energized in response to the current in another of the phase conductors of said circuit, a resistor and a capacitor connected in series across the secondary winding of said second transformer and arranged so that the voltage across said capacitor is equal in magnitude and opposite in phase to the voltage across said resistance means when only a predetermined rotational phase sequence current is present in said circuit and is out of phase with the voltage across said resistance means when only the other rotational phase sequence current is present in said circuit, and an output circuit connected to said capacitor and resistance means so that it is energized by the resultant of the voltage drops across said capacitor and resistance means.

9. A phase sequence network for a three-phase circuit comprising a single phase transformer having a primary winding connected to said circuit so as to be energized in response to the current in one of the phase conductors of said circuit, resistance means connected across the secondary winding of said transformer, a second transformer having a primary winding connected to said circuit so as to be energized in response to the current in another of the phase conductors of said circuit, a resistor and a capacitor connected in series across the secondary winding of said second transformer and arranged so that the voltage across said capacitor is equal in magnitude and opposite in phase to the voltage across said resistance means when only positive phase sequence current is present in said circuit and is out of phase with the voltage across said resistance means when only negative phase sequence current is present in said circuit, an output circuit connected to said capacitor and resistance means so that it is energized by the resultant of the voltage drops across said capacitor and resistance means, and means responsive to a three-phase fault on said circuit for varying the voltage drop produced across said resistance means by a given secondary voltage of said first mentioned transformer.

10. A phase sequence network for a three-phase circuit comprising a single phase transformer having a primary winding connected to said circuit so as to be energized in response to the current in one of the phase conductors of said circuit, resistance means connected across the secondary winding of said transformer, a second transformer having a primary winding connected to said circuit so as to be energized in response to the current in another of the phase conductors of said circuit, a resistor and a capacitor connected in series across the secondary winding of said second transformer and arranged so that the voltage across said capacitor is equal in magnitude and opposite in phase to the voltage across said resistance means when only positive phase sequence current is present in said circuit and is out of phase with the voltage across said resistance means when only negative phase sequence current is present in said circuit, an output circuit connected to said capacitor and resistance means so that it is energized by the resultant of the voltage drops across said capacitor and resistance means, means responsive to a three-phase fault on said circuit for varying the voltage drop produced across said resistance means by a given secondary voltage of said first-mentioned transformer, a primary winding for said second transformer connected to said circuit so as to be energized in response to the residual current in said three-phase circuit and having substantially one-third the number of turns of said other primary winding for said second transformer, and an adjustable primary winding for said first-mentioned transformer connected to said three-phase circuit so as to be energized in response to the residual current therein.

11. In a protective arrangement for a polyphase circuit, means for deriving from said circuit a single phase quantity normally responsive selectively to a predetermined rotational phase sequence component of the circuit current, means responsive to a predetermined fault condition of said circuit for rendering said first mentioned means operative to derive a single phase quantity responsive to the other rotational phase sequence component of the circuit current, means energized by said derived single phase quantities, and means controlled by said predetermined fault condition for varying the sensitiveness of said energized means to said single phase quantities.

12. In a protective arrangement for a polyphase circuit, means for deriving from said circuit a single phase voltage which is selectively dependent upon the magnitude of the negative phase sequence component of the circuit current, means responsive to a fault involving all of the conductors of said circuit for rendering said first-mentioned means operative to derive a single phase voltage which depends upon the positive phase sequence component of the circuit current, means energized by said derived single phase quantities, and means controlled by a fault involving all of the conductors of said circuit for varying the sensitiveness of said energized means to said single phase quantities.

ANDREW J. McCONNELL.

REFERENCES CITED

The following references are of record in the file of this patent:

UNITED STATES PATENTS

| Number | Name | Date |
| --- | --- | --- |
| 1,691,342 | Evans | Nov. 13, 1928 |
| 1,963,193 | Evans | June 19, 1934 |
| 2,095,754 | Le Vesconte et al. | Oct. 12, 1937 |
| 2,183,646 | Harder | Dec. 19, 1939 |
| 2,296,784 | Harder | Sept. 22, 1942 |
| 2,315,470 | Warrington | Mar. 30, 1943 |
| 2,406,617 | Lenser | Aug. 27, 1946 |